R. B. POLK.
TOOL FOR SECTIONALIZING CITRUS FRUITS.
APPLICATION FILED JAN. 18, 1922.
1,420,341.
Patented June 20, 1922.
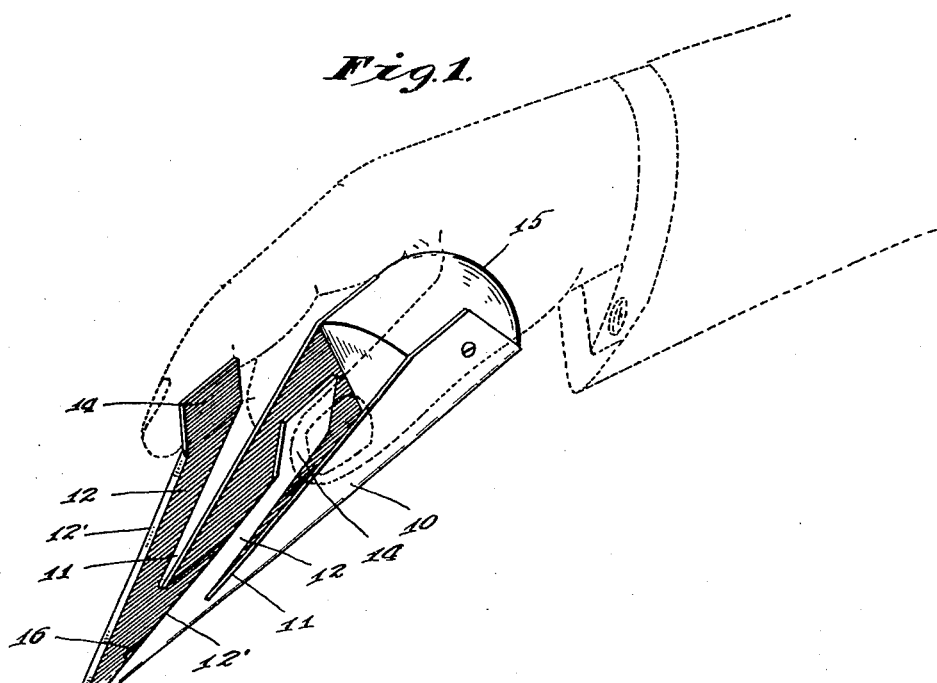
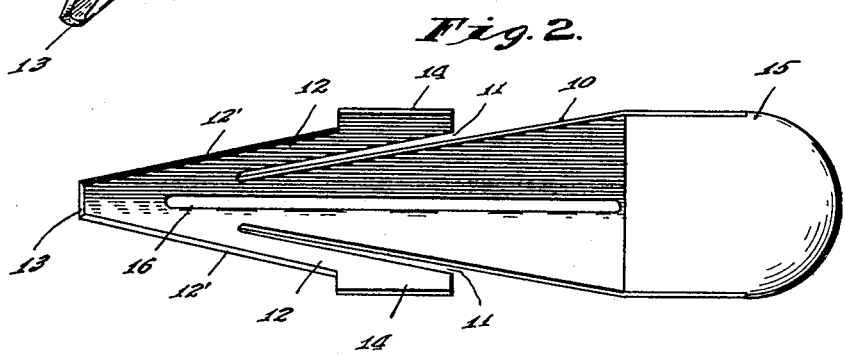
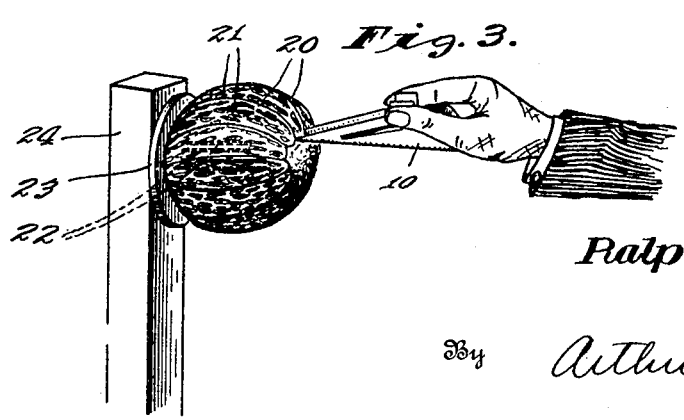
Inventor
Ralph B. Polk,
By Arthur M. Hood
Attorney

UNITED STATES PATENT OFFICE.

RALPH B. POLK, OF GREENWOOD, INDIANA.

TOOL FOR SECTIONALIZING CITRUS FRUITS.

1,420,341.  Specification of Letters Patent.  Patented June 20, 1922.

Application filed January 18, 1922. Serial No. 530,178.

*To all whom it may concern:*

Be it known that I, RALPH B. POLK, a citizen of the United States, residing at Greenwood, in the county of Johnson and State of Indiana, have invented new and useful Tools for Sectionalizing Citrus Fruits, of which the following is a specification.

The object of my invention is to provide a simple yet efficient tool by means of which the meat sections of citrus fruits, such as grapefruit, may be quickly and neatly removed from the fibrous partitions and seeds.

The accompanying drawings illustrate my invention: Figure 1 is a perspective view of my tool, an operator's hand being shown in dotted lines in order to indicate the manner of use of the tool; Figure 2 a plan; Figure 3 a perspective showing the manner of supporting the peeled fruit and using the tool.

In the drawings 10 indicates the main body of the tool formed of sheet metal and bent into a substantially U or V shape. The sides of the tool are slitted as indicated at 11—11 diagonally through a portion of their lengths so as to form a pair of spring tongues 12—12 which spring from the tip or point 13 of the tool. Tongues 12—12 are provided at their rear ends with finger pieces 14—14 and the rearwardly inclined upper edges 12′—12′ of said tongues, as well as the tip 13 are outwardly sharpened.

The rear end of the main body 10 may be filled, if desired, by a block 15 which will easily fit the palm of the hand of an operator.

In order to keep the main body 10 drained of juice, and to afford additional flexibility, I provide a longitudinal medial slot 16 through which the juice will promptly flow.

The manner of use of this improved tool is as follows: The grapefruit, or other citrus fruit, to be desectionalized is peeled by a cutting operation which will extend below the inner juice-retaining skin so that the edges of the radial partitions 20 of the fruit are exposed, thereby exposing the meat of the sections 21 of the fruit. The peeled fruit may then either be held in one hand of the operator or, most conveniently, be impaled upon a series of closely arranged prongs 22 (dotted lines in Fig. 3) carried by a rotary disk or table 23 rotatably mounted on a horizontal axis carried by a support 24. With my tool in his other hand, as indicated in Figs. 1 and 3, the operator will insert the tip 13 between two adjacent partition skins 20 and will then drive the tool axially of the fruit between the partition skins 20 far enough from the center of the fruit to avoid the seeds. During this movement the operator will note the spacing of the partition skins and, by exerting more or less pressure upon the free rear ends of the fingers 12, set the cutting edges 12′ to approximate the distance between the two partition skins 20 and thereby smoothly cut practically the entire meat section 21, as a whole piece, from the fruit so that it may be utilized in this condition for packing conditions. The resiliency, or perhaps rather the relative adjustability, of the cutting edges 12′ is exceedingly important, because, as is well known, the various meat sections of a grapefruit or other similar fruit vary greatly in each individual fruit. Consequently I preferably construct my tool so that the edges 12′ are normally spaced apart as much as the width of the greatest fruit section which may be expected because it is much easier for an operator to draw the two cutting edges together by compression between the thumb and finger than it would be to separate them by an outwardly applied force.

I believe however that it is broadly new to provide a tool of this general character and for this general purpose in which divergent cutting edges may be readily adjusted as to their relative spacing in order to closely approximate the varying segments of fruit.

By arranging the cutting edges 12′ at a fairly acute angle to the general axis of the tool a better cutting effect is obtained than would be obtained by arranging these cutting edges at right angles to the line of movement.

I claim as my invention:

1. A tool of the class described comprising a pair of divergent members having cutting edges and forming a trough the edges being supported in such manner as to be movable toward and from each other to vary the cross-section of the trough.

2. A tool of the class described formed of a sheet of metal bent into substantially V-shape cross section and comprising a pair of spring fingers having forward cutting edges, substantially as shown and described.

3. A tool of the class described formed of a sheet of metal bent into substantially V-shape cross-section and comprising a pair of spring fingers having forward rearwardly-inclined cutting edges, substantially as shown and described.

4. A tool of the class described formed of a sheet of metal bent into substantially V-shape cross-section and comprising a pair of rearwardly-inclined spring fingers having forward rearwardly-inclined cutting edges substantially as shown and described.

In witness whereof, I have hereunto set my hand at Miami, Florida, this 13th day of January, A. D. one thousand nine hundred and twenty two.

RALPH B. POLK.